(12) United States Patent
Lu et al.

(10) Patent No.: US 9,877,157 B2
(45) Date of Patent: Jan. 23, 2018

(54) AUTONOMOUS IN-DEVICE GNSS AUGMENTATION SYSTEM

(71) Applicant: MARVELL WORLD TRADE LTD, St. Michael (BB)

(72) Inventors: Zhicui Lu, Shanghai (CN); Zhike Jia, Fremont, CA (US); BoChih Liu, Shanghai (CN); Jian Cheng, Shanghai (CN); Jinfeng Liu, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 42 days.

(21) Appl. No.: 14/962,670

(22) Filed: Dec. 8, 2015

(65) Prior Publication Data

US 2016/0174037 A1    Jun. 16, 2016

Related U.S. Application Data

(60) Provisional application No. 62/091,829, filed on Dec. 15, 2014.

(51) Int. Cl.
*H04W 4/02* (2009.01)

(52) U.S. Cl.
CPC ........... *H04W 4/023* (2013.01); *H04W 4/026* (2013.01)

(58) Field of Classification Search
CPC .......... G01S 19/07; G01S 19/25; G01S 19/05; H04W 4/023
See application file for complete search history.

(56) References Cited

U.S. PATENT DOCUMENTS

| 9,465,114 | B2* | 10/2016 | Syrjarinne | G01S 19/05 |
| 2008/0228398 | A1* | 9/2008 | Syrjarinne | G01S 19/258 |
| | | | | 701/469 |
| 2015/0362597 | A1* | 12/2015 | Syrjarinne | G01S 19/27 |
| | | | | 342/357.58 |

\* cited by examiner

*Primary Examiner* — Myron K Wyche

(57) ABSTRACT

Aspects of the disclosure provide an apparatus that includes a navigation signal receiver and a processing circuit. The navigation signal receiver is to receive, from a plurality of satellites, first ephemeris data. The first ephemeris data is effective for a first time duration. The processing circuit is to predict, based on the first ephemeris data, second ephemeris data. The second ephemeris data is effective for a second time duration that is extended beyond the first time duration. The second ephemeris data is used by the navigation signal receiver to acquire satellite signals for positioning the apparatus during the second time duration.

15 Claims, 3 Drawing Sheets

US 9,877,157 B2

AUTONOMOUS IN-DEVICE GNSS AUGMENTATION SYSTEM

INCORPORATION BY REFERENCE

This present disclosure claims the benefit of U.S. Provisional Application No. 62/091,829, "Automatic In-device GNSS Augmentation System" filed on Dec. 15, 2014, which is incorporated herein by reference in its entirety.

BACKGROUND

A modern mobile device can incorporate various functions, such as of a satellite positioning system receiver, of a cellular transceiver, or of a wireless transceiver. When a mobile device functions as a satellite positioning system receiver, the mobile device can specify a device's position by use of signals from satellites. Satellite based positioning can provide high accuracy, but require a positive line of sight between satellites and the mobile device. Further, receiving and processing satellite positioning signals may consume substantial energy and hence shorten battery duration.

SUMMARY

Aspects of the disclosure provide an apparatus that includes a navigation signal receiver and a processing circuit. The navigation signal receiver is to receive, from a plurality of satellites, first ephemeris data. The first ephemeris data is effective for a first time duration. The processing circuit is to predict, based on the first ephemeris data, second ephemeris data. The second ephemeris data is effective for a second time duration that is extended beyond the first time duration. The second ephemeris data is used by the navigation signal receiver to acquire satellite signals for positioning the apparatus during the second time duration.

According to an aspect of the disclosure, the apparatus includes a memory to store the second ephemeris data when the navigation signal receiver is turned off. The second ephemeris data is provided to the navigation signal receiver when the navigation signal receiver is turned back on.

In an embodiment, the apparatus includes a wireless transceiver to receive wireless signals from a wireless communication system network. The processing circuit is to determine a reference position of the apparatus based on the wireless signals received from the wireless communication system network. The reference position and the second ephemeris data are used by the navigation signal receiver to reduce a search space to acquire satellite signals for positioning the apparatus during the second time duration. In an example, the memory is to store a local positioning database for the wireless communication system network. The processing circuit is to calculate the reference position based on the wireless signals and the local positioning database.

In an embodiment, the processing circuit is to predict the second ephemeris data based on a parameterized model with earth orientation parameters and a satellite dynamics model.

Aspects of the disclosure provide a method for positioning an apparatus. The method includes receiving, by a navigation signal receiver, first ephemeris data effective for a first time duration from a plurality of satellites, predicting, in the apparatus, based on the first ephemeris data, second ephemeris data effective for a second time duration that is extended beyond the first time duration, and acquiring satellite signals for positioning the apparatus during the second time duration based on the second ephemeris data.

Aspects of the disclosure provide an apparatus that includes a wireless transceiver, a navigation signal receiver and a processing circuit. The wireless transceiver is to receive wireless signals from a wireless communication system network. The processing circuit is to determine a reference position of the apparatus based on the wireless signals received from the wireless communication system network. The navigation signal receiver is to narrow a search space based on the reference position to acquire satellite signals for positioning the apparatus.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
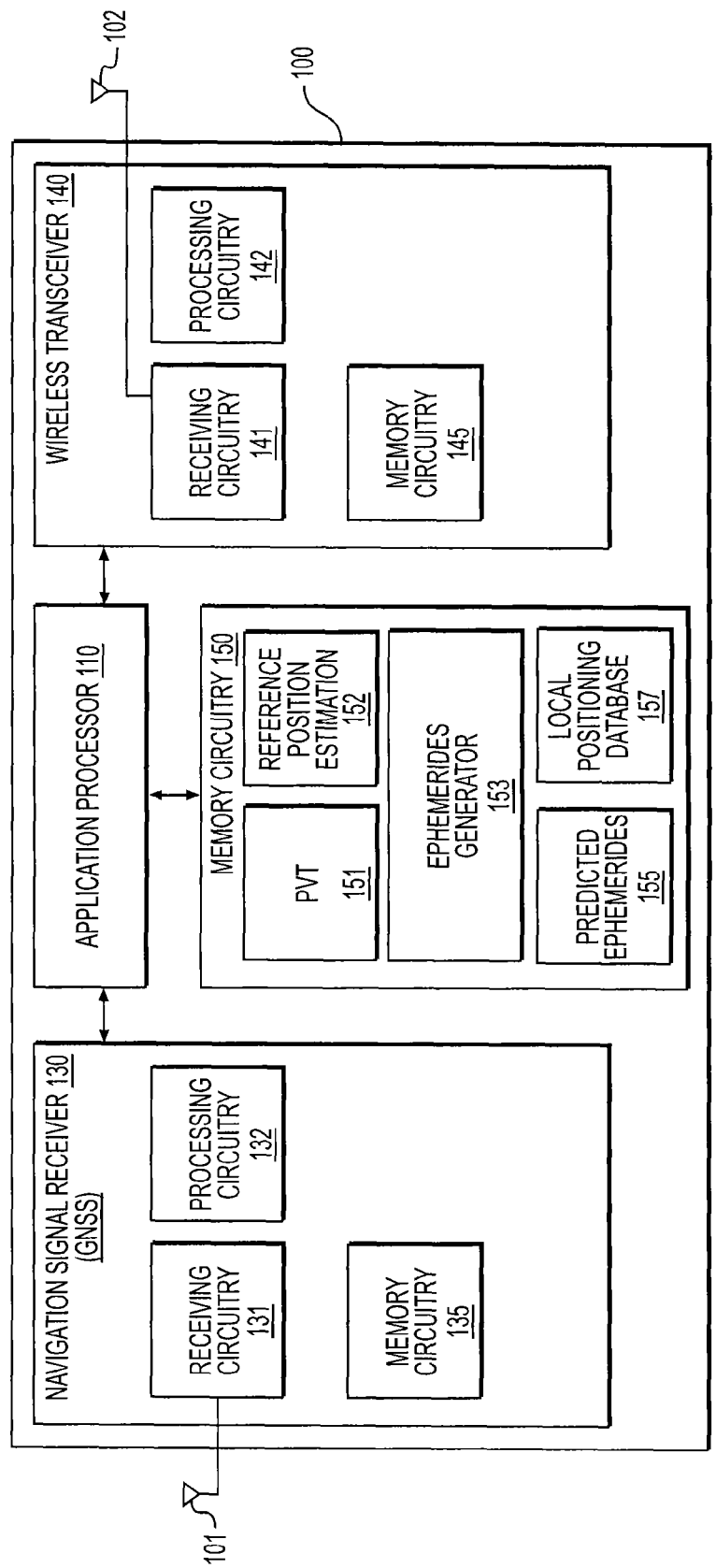
FIG. 1 shows a block diagram of an electronic device 100 according to an aspect of the disclosure.

FIG. 1 shows a block diagram of an electronic device 100 according to an embodiment of the disclosure. The electronic device 100 receives, from a plurality of satellites, ephemeris data that is effective for a relatively short time duration. Based on the received ephemeris data, the electronic device 100 predicts additional ephemeris data that is effective for an extended time duration beyond the relatively short time duration. The additional ephemeris data is used by the electronic device 100 to speed up a start process to acquire satellite signals and to position the electronic device 100 in the extended time duration.

The electronic device 100 can be any suitable device, such as a tablet computer, a smart phone, a camera, a wearable device, a device installable on a vehicle, and the like. According to an aspect of the disclosure, one or more applications installed on the electronic device 100 require location information of the electronic device 100.

In the FIG. 1 example, the electronic device 100 includes a navigation signal receiver 130 and an application processor 110 coupled together as shown in FIG. 1. In an embodiment, the navigation signal receiver 130 is implemented on a first integrated circuit (IC) chip and the application processor 110 is implemented on a second IC chip. The two IC chips are mounted on a printed circuit board (PCB) and suitably coupled together, for example, by printed copper lines on the PCB. In an example, the navigation signal receiver 130 can use the computation resource and storage resource of the application processor 110, thus the navigation signal receiver 130 and the application processor 110 operate in parallel for positioning the electronic device 100. In the example, the first IC chip with the navigation signal receiver 130 can be implemented with fewer hardware and software to reduce chip size and to reduce power consumption.

According to an aspect of the disclosure, the electronic device 100 is configured to perform autonomous, in-device GNSS augmentation. The electronic device 100 performs ephemeris data prediction and the reference position estimation, and uses the predicted ephemeris data and the estimated reference position to speed up the start process. In an embodiment, the application processor 110 is configured to predict the additional ephemeris data, and to provide the additional ephemeris data to the navigation signal receiver 130 to speed up a start process when the navigation signal receiver 130 is turned on. In another embodiment, the application processor 110 is configured to determine a reference position, such as a coarse position of the electronic device 100 with a reduced resolution, and provide the reference position to the navigation signal receiver 130 to speed up the start process when the navigation signal receiver 130 is turned on to determine a more accurate position of the electronic device 100.

According to an aspect of the disclosure, the electronic device 100 includes a wireless transceiver 140 configured to transmit wireless signals to and receive wireless signals from a wireless communication system network. In an example, the wireless communication system network can be a cellular system network, such as global system for mobile (GSM), code division multiple access (CDMA), wideband code division multiple access (WCDMA), and long term evolution (LTE) and the like. In another example, the wireless communication system network can be a wireless local area network (LAN) according to a protocol, such as an Institute of Electrical and Electronics Engineers (IEEE) 802.11 based protocol. The application processor 110 is configured to predict the reference position based on received wireless signals and provide the reference position to the navigation signal receiver 130 to speed up the start process when the navigation signal receiver 130 is turned on.

According to an aspect of the disclosure, the navigation signal receiver 130 is a Global Navigation Satellite System (GNSS) receiver configured to receive satellite positioning signals transmitted by a satellite system, such as the Global Positioning System (GPS), the GLObalnaja NAvigatsionnaja Sputnikovaja Sistema (GLONASS) satellite system, the Galileo navigation satellite system, the Beidou navigation satellite system, and the like. Based on the satellite positioning signals, the electronic device 100 can determine a relatively accurate location of the electronic device 100.

In the FIG. 1 example, the navigation signal receiver 130 includes a receiving circuitry 131, a processing circuitry 132, and a memory circuitry 135 coupled together, and the wireless transceiver 140 includes a receiving circuitry 141, a processing circuitry 142 and a memory circuitry 145 coupled together. The application processor 110 is coupled with a memory circuitry 150. In an embodiment, the navigation signal receiver 130, the application processor 110, the wireless transceiver 140 and the memory circuitry 150 are respectively implemented on separate IC chips. In an example, the IC chips are mounted on a PCB and are suitably coupled, for example by printed copper lines on the PCB. In another embodiment, multiple components can be integrated as a part of a single IC.

Specifically, the receiving circuitry 131 is coupled to an antenna 101 that generates an electrical signal in response to electromagnetic waves corresponding to satellite signals in the air. The receiving circuitry 131 includes suitable circuits to process the electrical signal and obtain a digital signal from the electrical signal. In an example, the receiving circuitry 131 includes various analog circuits (not shown), such as amplifier, filter, down-converter and the like to process the electrical signal using analog processing techniques. In addition, the receiving circuit 131 includes an analog-to-digital converter (ADC) (not shown) that converts the processed analog signal to a digital sequence. The digital sequence includes information, such as ranging information for measuring the distance from satellites to the electronic device 100, navigation messages sent from the satellites, and the like.

The processing circuitry 132 includes digital circuits to process the digital sequence to obtain the information. In an example, the processing circuitry 132 includes circuits to correlate the digital sequence with locally generated codes in the navigation signal receiver 130, and includes circuits to demodulate and decode the digital sequence to extract the navigation message.

The memory circuitry 135 is configured to store instructions and data. In an example, the processing circuitry 132 is implemented using a central processing unit (CPU). The memory circuit 135 stores instructions for controlling the CPU to process the digital sequence. In another example, the memory circuit 135 stores information to assist the navigation signal receiver 130 to speed up a start process.

The navigation signal receiver 130 can be switched off to save power when position information is not needed, and can be switched on when position information is needed.

According to an aspect of the disclosure, when the navigation signal receiver 130 is switched on, the application processor 110 provides information to the navigation signal receiver 130 to speed up a start process to acquire satellite signals and navigation data, and to calculate the position of the electronic device 100.

According to an aspect of the disclosure, the navigation signal receiver 130 can have a cold start, a warm start, or a hot start depending on availability of priori information. In an embodiment, when the navigation signal receiver 130 is turned on with no priori information, for example starts from a factory reset, the navigation signal receiver 130 has a cold start. For the cold start, in an example, the navigation signal receiver 130 systematically searches for possible satellites in the satellite system from which the navigation signal receiver 130 is able to receive satellite signals at its present location. Without priori information, the navigation signal receiver 130 needs to scan possible satellite signals in a space of multiple dimensions, such as a first dimension of code phase, a second dimension of Doppler frequency, a third dimension of pseudorandom noise number (PRN) numbers. Without the priori information, it takes a long time for the receiving circuitry 131 to acquire the satellite signals.

In addition, it takes a relatively long time to extract complete information from the satellite signals. In an embodiment, the satellite signals carry navigation messages. The navigation message from a satellite includes satellite clock information, ephemeris information of the satellite, and almanac data of the satellite system. The almanac data includes coarse orbit and status information for each of the satellites in the satellite system. The ephemeris information includes accurate orbit information which allows the navigation signal receiver 130 to calculate the position of the satellite. Each satellite transmits its own ephemeris information and almanac data of satellites in the satellite system. The ephemeris information is highly detailed and considered valid for a relatively short time, such as 1-4 hours. The almanac data is considered valid for a relatively long time, such as over 180 days. For example, it takes a satellite over 12.5 minutes to transmit the complete almanac data of the satellite system.

The information in the navigation messages is useful to speed up a start process for the navigation signal receiver 130. In an embodiment, potential visible satellites for the electronic device 100 can be determined based on the almanac data of the satellite system to reduce the search space, and reduce the time to acquire the satellite signals. In another embodiment, ephemeris information can be used to narrow down code phase search range and Doppler frequency search space to reduce the time to acquire the satellite signals.

For example, at a time when the navigation signal receiver 130 is turned on, the navigation signal receiver 130 has valid almanac data, and a coarse estimation of time and position state, such as an estimation of a current time with an error within 20 seconds, an estimation of a current position with an error within 100 kilometers, an estimation of a current velocity with an error within 25 m/s, the navigation signal receiver 130 has a warm start. For warm start, the navigation signal receiver 130 can determine the potential visible satellites at the current position. Then, the navigation signal receiver 130 acquires satellite signals from the visible satellites to obtain respective satellite's ephemeris data and ranging information from the visible satellites. Each satellite broadcasts its ephemeris data every 30 seconds, and ephemeris data is valid for up to four hours. Based on the ephemeris data and the ranging information, the position of the electronic device 100 can be determined.

For another example, at a time when the navigation signal receiver 130 is turned on, the navigation signal receiver 130 has valid time, position, almanac, and ephemeris data, the navigation signal receiver 130 has a hot start. For the hot start, the navigation signal receiver 130 can determine the potential visible satellites at the current position, and narrow down the ranging code space to enable a rapid acquisition of the satellite signals.

According to an aspect of the disclosure, the application processor 110 predicts additional ephemeris data effective for an extended time, such as up to 14 days, and stores the additional ephemeris data for example in the memory circuitry 150. When the navigation signal receiver 130 is turned on, for example within 14 days, the application processor 110 predicts a reference position of the electronic device 100 based on received wireless signals. Then, the application processor 110 provides the additional ephemeris data and the reference position to the navigation signal receiver 130. Based on the additional ephemeris data and the reference position, the navigation signal receiver 130 can determine the potential visible satellites at the current position, and narrow down the ranging code space to enable a rapid acquisition of the satellite signals. Then, the time to first fix which measures the time required for the navigation signal receiver 130 to acquire satellite signals and navigation data and to calculate the position solution can be reduced to improve user experience.

In the FIG. 1 example, the memory circuitry 150 is configured to store software instructions and data for applications and the application processor 110 is configured to execute the software instructions to run the software instructions to process the data. For example, the memory circuitry 150 stores software instructions 151 for position, velocity and time (PVT) calculation, software instructions 152 for reference position estimation, software instructions 153 for ephemeris data prediction. Further, the memory circuitry 150 can store the predicted ephemeris data as shown by 155 and a local positioning database as shown by 157.

In an example, the application processor 110 can execute the software instructions 151 to receive information from the navigation signal receiver 130, calculate position, velocity and time, determine the location of the electronic device 100, and can perform location based applications.

Further, the application processor 110 can execute the software instructions 153 to predict ephemeris data for extended time duration and the store the predicted ephemeris data in the memory circuitry 150.

The application processor 110 can also execute the software instructions 152 to estimate a reference position based on the local positioning database 157 and the received wireless signals by the wireless transceiver 140.

In the wireless transceiver 140, the receiving circuitry 141 is coupled to an antenna 102 that generates an electrical signal in response electromagnetic waves corresponding to wireless signals in the air. The receiving circuitry 141 includes suitable circuits to process the electrical signal and obtain a digital signal from the electrical signal. In an example, the receiving circuitry 141 includes various analog circuits (not shown), such as amplifier, filter, down-converter and the like to process the electrical signal using analog processing techniques. In addition, the receiving circuit 141 includes an analog-to-digital converter (ADC) (not shown) that converts the processed analog signal to a digital sequence. The digital sequence includes information, such as identifications of radio base stations, and the like. In addition, in an example, the receiving circuit 142 measures a received signal strength indicator (RSSI) for each of the received wireless signals.

The processing circuitry 142 includes digital circuits to process the digital sequence to obtain the information. In an example, the processing circuitry 142 includes circuits to extract the identification of a radio base station from the wireless signal sent from the radio base station.

The memory circuitry 145 is configured to store instructions and data. In an example, the processing circuitry 142 is implemented using a central processing unit (CPU). The memory circuit 145 stores instructions for controlling the CPU to process the digital sequence.

According to an aspect of the disclosure, when the electronic device 100 enters an area covered by a wireless LAN, the wireless transceiver 140 receives wireless signals that carry a local positioning database. In an example, the location positioning database includes identifications associated with positions of access points in the wireless LAN. The local positioning database is then installed in the memory circuitry 150.

Further, at a location in the area covered by the wireless LAN, the receiving circuitry 141 receives beacon signals from visible access points in the wireless LAN. The receiving circuitry 141 measures RSSI values of the received beacon signals. The beacon signals respectively carry identifications of the visible access points in the wireless LAN. The processing circuitry 142 extracts the identifications. In an example, the wireless transceiver 140 provides the RSSI values associated with the identifications of the beacon signals to the application processor 110. The application processor 110 executes the software instructions 152 to estimate the reference position based on the RSSI values associated with the identifications of the beacon signals according to the local positioning database 157. For example, the application processor 110 extracts positions of the visible access points based on the identifications. Further, in an example, the application processor 110 weights the positions according to the RSSI values. Then, the application processor 110 calculates an average of the weighted positions as the reference position.

It is noted that the software instructions 153 for ephemeris data prediction can be implemented according to any suitable algorithm. In an example, an algorithm based on a parameterized earth model and a satellite dynamics model is used to implement the software instructions 153.

Figure 2:
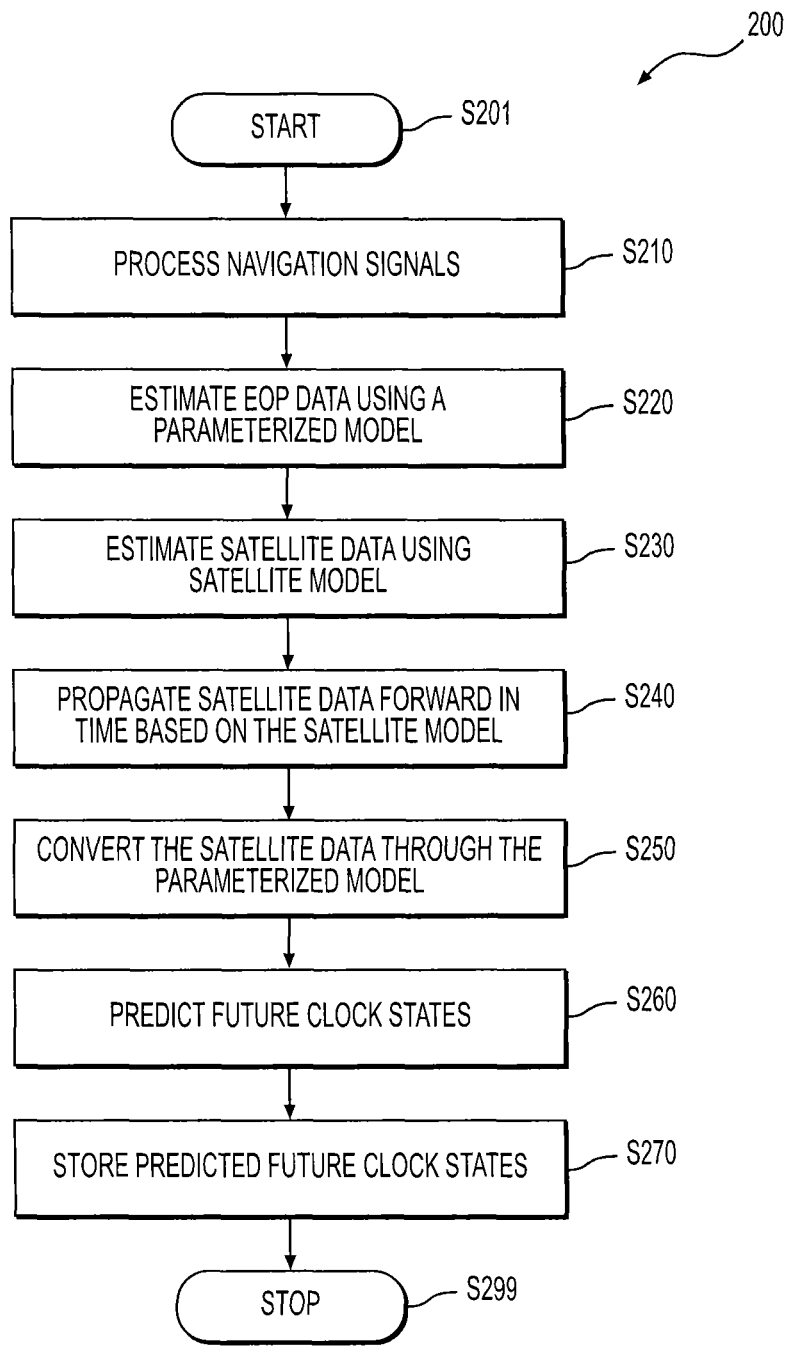
FIG. 2 shows a flow chart outlining a process 200 according to an embodiment of the disclosure.

FIG. 2 shows a flow chart outlining a process 200 according to an embodiment of the disclosure. In an example, the application processor 110 executes the software instructions to perform the process 200. The process starts at S201 and proceeds to S210.

At S210, navigation signals are processed to extract ephemeris data. In an example, when the navigation signal receiver 130 is on, navigation signals are received from visible satellites. The navigation signals respectively carry clocks states and ephemeris data of the visible satellites. The ephemeris data and the clock states for the visible satellites can be extracted from the navigation signals.

At S220, earth orientation parameters (EOP) are estimated according to a parameterized model. In an example, the rotation irregularities for the earth can be described using a collection of earth orientation parameters, such as universal time, coordinates of the pole, celestial pole offsets, and the like. In an example, the earth orientation parameters are iteratively estimated according to a parameterized model.

Specifically, the parameterized model for estimating the EOP data is based on a parametric fit to historic time series of measured EOP, such as those being produced by the International Earth Rotation and Reference Systems Service (IERS) or the National Geo-spatial Agency (NGA).

At S230, satellite data are estimated using a satellite model. In an example, a satellite dynamics model is built and used to iteratively estimate orbital position, velocity, and dynamic parameters of the satellites.

Specifically, in an example, the most recently satellite data stored in the memory circuit 135 is converted from the Keplerian model frame to the Earth-centered-Earth-fixed (ECEF) frame in order to produce, for each of visible satellites, initial orbital position and velocity condition, and then determines, for each of visible satellites, initial orbital dynamic parameters based on real satellite orbit data. The orbital conditions and orbital dynamic parameters will be iteratively estimated through numerical integration of satellite equation of motion using satellite dynamics model (e.g., force model) until the convergence (i.e., the currently estimated orbital position, velocity, and orbital dynamic parameters are sufficiently close to the broadcast orbit of that satellite.) is achieved.

At S240, satellite data is propagated forward in time based on the satellite model. In an example, the satellite dynamics model is used to propagate the orbital position, velocity, and dynamic parameters forward in time.

At S250, the satellite data is converted through the parameterized model. Specifically, in an example, the satellite data is converted from an Earth-centred inertial (ECI) coordinate system to an ECEF Cartesian coordinate using the EOP data.

At S260, further clock states of the satellites are iteratively estimated based on a prediction model. Specifically, in an example, the most recently satellite data stored in the memory circuit 135 is used to produce, for each of visible satellites, the clock data through a quadratic polynomial model. Then, the future clock states of the satellites are calculated based on a prediction model using the clock data. The model of clock state prediction is a quadratic polynomial in time.

At S270, the predicted clock states and the satellite data (ephemeris data) for the visible satellites are stored in a memory. Then the process proceeds to S299 and terminates.

It is noted that the clock states of the satellites can be predicted on any given interval and will cover the period of validity for a satellite. In an embodiment, in a case where the GPS broadcast satellite data is only valid for a four hour period. To extend the capability beyond the four hour period, there is a need in the art for providing multiple ephemerides. 6 ephemerides for a satellite would be provided to describe the satellite state for one day. For other GNSS, the period of validity may be different, and accordingly, the amount of multiple ephemerides may also be different In an embodiment, the process 200 is repetitively executed when the navigation signal receiver 130 is active and receives new navigation signals.

Figure 3:
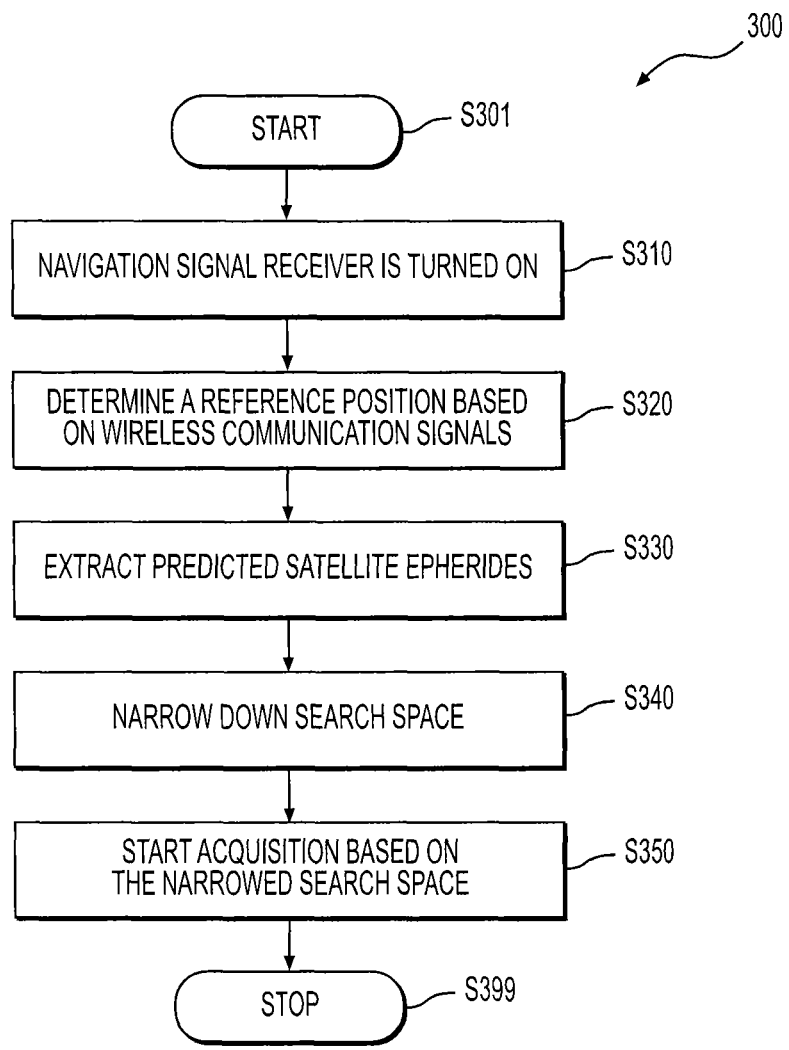
FIG. 3 shows a flow chart outlining a process 300 according to an embodiment of the disclosure.

FIG. 3 shows a flow chart outlining a process 300 for starting a navigation signal receiver according to an embodiment of the disclosure. In an example, the process 300 is executed in the electronic device 100. The process starts at S301, and proceeds to S310.

At S310, a navigation signal receiver is turned on. In the FIG. 1 example, the navigation signal receiver 130 is turned off when location information is not needed to save power. When location information is needed, the navigation signal receiver 130 is turned on. In an example, the navigation signal receiver 130 is turned off for more than four hour, and is turned back on within 14 days.

At S320, a reference position is determined based on wireless communication signals. For example, the wireless transceiver 140 receives beacon signals respectively from a plurality of radio stations in a wireless communication system network (e.g., wireless LAN) or a combined wireless communication system network thereof. The beacon signals include respective identifications of the radio stations. In an example, the wireless transceiver 140 obtains a received signal strength indicator (RSSI) for each of the received beacon signals, and provides RSSI values and identifications of the radio stations to the application processor 110. The application processor 110 executes the software instructions 152 to determine a reference position based on the RSSI values, the identifications of the radio stations and the local positioning database 157. For example, when the electronic device 100 enters an area covered by the wireless LAN, the local positioning database 157 is installed in the electronic device 100. The local positioning database 157 includes positions of all access points in the wireless LAN. The application processor 110 weighs the positions of the identified access points, and calculates an average of the weighted positions as the reference position.

At S330, predicted satellite ephemeris data are read from a memory circuitry. For example, the satellite ephemeris data is predicted effective up to 14 days and stored in the memory circuitry 150. The application processor 110 reads the predicted ephemeris data 155 from the memory circuitry 150, and provides the predicted ephemeris data 155 to the navigation signal receiver 130.

At S340, a search space is narrowed based on the reference position and the predicted satellite ephemeris data. In an example, the navigation signal receiver 130 includes almanac data that is effective up to 180 days. Then, the navigation signal receiver 130 narrows down the code phase search range and the Doppler search frequency space based on the almanac data, the reference position, and the predicted satellites ephemeris data effective up to 14 days.

At S350, the navigation signal receiver 130 starts navigation signal acquisition based on the narrowed search space. In the FIG. 1 example, the navigation signal receiver 130 then starts acquiring satellite signals based on the narrowed search space. With the narrowed search space, the navigation signal receiver 130 speeds up the satellite signal acquisition, and the position fix can be calculated at a reduced time. Then the process proceeds to S350 and terminates.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
   a navigation signal receiver to receive, from a plurality of satellites, first ephemeris data and WiFi signals from a plurality of access points, wherein the first ephemeris data is effective for a first time duration; and
   a processing circuit to predict, based on the first ephemeris data, a parameterized model with earth orientation parameters, a satellite dynamics model, and the received WiFi signals, second ephemeris data, wherein the second ephemeris data is effective for a second time duration, that is extended beyond the first time duration, the second ephemeris data being used by the navigation signal receiver to acquire satellite signals for positioning the apparatus during the second time duration.

2. The apparatus of claim 1, further comprising:
   a memory to store the second ephemeris data when the navigation signal receiver is turned off.

3. The apparatus of claim 2, wherein the second ephemeris data is provided to the navigation signal receiver when the navigation signal receiver is turned back on.

4. The apparatus of claim 1, wherein
   a wireless transceiver is to receive wireless signals from a wireless communication system network; and
   the processing circuit is to determine a reference position of the apparatus based on the wireless signals received from the wireless communication system network, the reference position and the second ephemeris data are used by the navigation signal receiver to reduce a search space to acquire satellite signals for positioning the apparatus during the second time duration.

5. The apparatus of claim 4, wherein
   the memory is to store a local positioning database for the wireless communication system network; and
   the processing circuit is to calculate the reference position based on the wireless signals and the local positioning database.

6. A method for positioning a device, the method comprising:
   receiving, by a navigation signal receiver, first ephemeris data and WiFi signals from a plurality of access points, wherein the first ephemeris data is effective for a first time duration from a plurality of satellites;
   predicting, in the device, based on the first ephemeris data, a parameterized model with earth orientation parameters, a satellite dynamics model, and the received WiFi signals, second ephemeris data, wherein the second ephemeris data is effective for a second time duration that is extended beyond the first time duration; and
   acquiring satellite signals for positioning the device during the second time duration based on the second ephemeris data.

7. The method of claim 6, further comprising:
   storing the second ephemeris data when the navigation signal receiver is turned off.

8. The method of claim 7, further comprising:
   providing the second ephemeris data to the navigation signal receiver when the navigation signal receiver is turned back on.

9. The method of claim 6, further comprising:
   receiving wireless signals from a wireless communication system network; and
   determining a reference position of the apparatus based on the wireless signals; and
   narrowing a search space based on the reference position and the second ephemeris data to acquire satellite signals.

10. The method of claim 9, further comprising:
    storing a local positioning database for the wireless communication system network; and
    determining the reference position of the device based on the wireless signals received from the wireless communication system network and the local positioning database.

11. An apparatus, comprising:
    a wireless transceiver to receive wireless signals from a wireless communication system network including at least WiFi signals received from a plurality of access points;
    a processing circuit to determine a reference position of the apparatus based on the wireless signals received from the wireless communication system network; and
    a navigation signal receiver to narrow a search space based on the reference position, a parameterized model with earth orientation parameters, a satellite dynamics model, and the received WiFi signals to acquire satellite signals for positioning the apparatus.

12. The apparatus of claim 11, further comprising:
    a memory to store a local positioning database for the wireless communication system network; and
    the processing circuit is to calculate the reference position based on the wireless signals and the local positioning database.

13. The apparatus of claim 11, wherein
    the navigation signal receiver is to receive, from a plurality of satellites, first ephemeris data, wherein the first ephemeris data is effective for a first time duration; and
    the processing circuit is to predict, based on the first ephemeris data, second ephemeris data, wherein the second ephemeris data is effective for a second time duration that is extended beyond the first time duration, the second ephemeris data and the reference position being used by the navigation signal receiver to reduce a search space to acquire satellite signals for positioning the apparatus during the second time duration.

14. The apparatus of claim 13, further comprising:
    a memory to store the second ephemeris data when the navigation signal receiver is turned off.

15. The apparatus of claim 14, wherein the second ephemeris data is provided to the navigation signal receiver when the navigation signal receiver is turned back on.

* * * * *